United States Patent [19]

Berthet et al.

[11] Patent Number: 5,073,586

[45] Date of Patent: Dec. 17, 1991

[54] FILLED COMPOSITIONS

[75] Inventors: Michelle M. N. C. Berthet, Brussels, Belgium; Brian R. Trego, Dinas Powys, Wales; Hans-Juergen Wessely, Nivelles, Belgium

[73] Assignee: Dow Corning S.A., Seneffe, Belgium

[21] Appl. No.: 511,879

[22] Filed: Apr. 20, 1990

Related U.S. Application Data

[63] Continuation of Ser. No. 259,384, Oct. 18, 1988, abandoned.

[30] Foreign Application Priority Data

Oct. 24, 1987 [GB] United Kingdom ............... 8724958

[51] Int. Cl.$^5$ .................................................. C08K 5/41
[52] U.S. Cl. ...................................... 524/159; 524/161; 524/166; 524/745; 524/746; 524/787; 524/788; 524/860; 524/863
[58] Field of Search ............... 524/161, 166, 159, 745, 524/860, 787, 788, 863, 746; 528/23

[56] References Cited

U.S. PATENT DOCUMENTS

| | | | |
|---|---|---|---|
| 4,269,761 | 5/1981 | Suhoza | 260/45.7 |
| 4,307,009 | 12/1981 | Lüders et al. | 260/42.14 |
| 4,386,169 | 5/1983 | Artur et al. | 523/200 |
| 4,456,710 | 10/1984 | Lüders et al. | 523/200 |
| 4,482,670 | 11/1984 | Saam et al. | 524/860 |
| 4,508,887 | 2/1985 | Kohl | 528/21 |
| 4,608,412 | 8/1986 | Freiberg | 524/724 |

*Primary Examiner*—Melvyn I. Marquis
*Assistant Examiner*—R. Dean, Jr.
*Attorney, Agent, or Firm*—Edward C. Elliott

[57] ABSTRACT

The specification discloses a curable composition comprising 100 parts by weight of polysiloxane, 50 to 200 parts by weight of finely divided filler having an average particle size greater than 0.05 micron and not less than 0.5 parts by weight per 100 parts by weight of the filler of an additive which is a reaction product of an organic amine, or an oxide, hydroxide, carbonate, or bicarbonate or a mixture thereof with a sulphonic acid of the formula $RSO_3H$ in which R represents a hydrocarbon group which may have halogen or amino substituents and which contains not less than six carbon atoms. Preferred additives are reaction products of the sulphonic acid and an oxide, hydroxide, carbonate or bicarbonate of sodium, magnesium, zinc, calcium, barium, aluminium or a mixture thereof. The group R of the sulphonic acid may be $R'C_6H_4$ where $R'$ represents an alkyl group having 6 to 18 carbon atoms and a preferred acid is dodecylbenzenesulphonic acid. The filler is preferably basic and may be oxide, hydroxide, carbonate or bicarbonate of calcium, magnesium, barium or zinc or a mixture thereof. Preferably the polysiloxane corresponds to a mixture and/or a reaction product of a polydiorganosiloxane $HO(R''_2SiO)_xH$ with a compound containing silicon-bonded groups which are reactive therewith under the influence of moisture.

10 Claims, No Drawings

FILLED COMPOSITIONS

This is a continuation of copending application Ser. No. 259,384 filed on Oct. 18, 1988, now abandoned.

This invention is concerned with filled compositions.

It is a practice in the preparation of compositions for various purposes to employ a thermoplastic or thermosetting material together with fillers, extenders, cross linkers, adhesion promoters, catalysts, colorants and various other additives as desired. The polymer may be introduced to the composition as such or may be formed in situ during preparation of the composition. It may remain unchanged during use of the composition or may become modified as a result of curing reactions which occur, for example, when separately packaged parts of the composition are mixed with each other. Finely divided fillers may be employed to enable provision of reduced cost compositions. They may also make important contributions to rheology of the composition and properties of articles formed from the composition, for example, abrasion resistance, tensile and tear strength, hardness and modulus. For example, fine particle fumed silicas are used in compositions from which silicone rubbers are made in order to improve strength in the cured rubber. Inclusion of increased amounts of filler in a liquid composition leads to stiffening of the composition and a reduction in flowability of the composition which leads to a need for increased applied shear during mixing to achieve the desired homogenous mixed state of the composition as greater amounts of filler are used. The proportion of a filler employed in any particular composition may be selected bearing in mind the rheology required of the composition in its liquid state, compatibility of the filler and polymer, and the shape and size of the filler particles as well as properties required of articles formed from the composition.

Among the commonly employed fillers are the silicas, clays and basic materials, for example carbonates as exemplified by calcium carbonate. Calcium carbonate fillers are commonly available in stearate coated form. With a view to improving certain aspects of the performance of basic fillers principally associated with compatibility of the filler and base polymer, various proposals have been made for the treatment of such fillers with, for example saturated carboxylic acids. For example, U.S. Pat. No. 4 386 169 discloses the reinforcement of elastomeric/polymeric matrices as exemplified by e.g. polyvinyl chloride with calcium carbonate filler surface treated with both an organic sulphonic acid or salt thereof and a fatty acid or salt thereof in amounts to enhance impact strength thereof. European Patent Specification 83 084 discloses a composition comprising polyoxymethylene, an alkaline earth carbonate and a small amount of an alkali or alkaline earth salt of selected sulphonic acids; the compositions are said to have improved flow, mechanical properties and colour retention. European Patent Specification 17 038 discloses thermoplastic, filler containing, polyolefin compositions in which the filler comprises an alkaline earth carbonate and a small amount of specified sulphonic acids or their alkali metal salts; the compositions are said to have improved physical properties especially toughness of the moulded composition. European Patent Specification 16 986 discloses enhancing the thermal stability of polymeric compositions containing polymeric material as exemplified by polyolefins, filler and an ammonium, alkali metal or alkaline earth metal salt of monoalkyl or dialkylnapthalene sulphonic acid.

We have now found that certain properties of curable compositions comprising a polysiloxane and a finely divided filler can be improved if there is incorporated in the composition a proportion of an additive comprising a basic material treated with a selected sulphonic acid.

The present invention provides in one of its aspects a composition comprising 100 parts by weight of polysiloxane, 50 to 200 parts by weight of finely divided filler having an average particle size greater than 0.05 microns and comprising an oxide, hydroxide, carbonate, or bicarbonate of calcium, magnesium, barium, or zinc, or a mixture thereof, and not less than 0.5 parts by weight per 100 parts by weight of the filler of an additive consisting of a reaction product of an organic amine, or a metal oxide, hydroxide, carbonate, or bicarbonate or a mixture thereof with a sulphonic acid of the formula $RSO_3H$ in which R represents a hydrocarbon group which may have halogen or amino substituents and which contains not less than six carbon atoms, with the proviso that if any filler having an average particle size less than 0.5 micron is present it must be less than the amount of filler present which has an average particle size greater than 0.05 micron.

Compositions according to the invention are highly filled materials, and the fillers employed may be those which show a significant reinforcing effect, or those which do not, or a mixture thereof. In a composition according to the invention, suitable fillers include the oxides, hydroxides, carbonates and bicarbonates of, for example, calcium, magnesium, barium or zinc produced by grinding or precipitation methods to provide filler particles of an average particle size in the range 0.05 microns to 5 microns. Compositions in which the filler consists solely of materials having an average particle size of less than 0.05 microns, for example fumed silicas, do not show the advantageous properties shown by compositions according to the invention in which the sole filler used is calcium or magnesium carbonate. However, materials having an average particle size of less than 0.05 microns may be included as a minor proportion of the composition. We prefer to employ calcium or magnesium carbonate as the sole or principle filler as these materials are generally readily available. The carbonate used may be a surface treated material (for example stearate coated calcium carbonate) or an untreated material.

Compounds suitable for use in the preparation of the additive for use in the present invention are those which are basic and thus capable of reaction with the acid to form a salt, for example organic amines and the oxides, hydroxides, carbonates, and bicarbonates of sodium, magnesium, zinc, calcium, barium, aluminium and mixtures thereof. The carbonate used may be a surface treated material as aforesaid.

Sulphonic acids suitable for use in the preparation of the additive for use in the present invention are of the formula $RSO_3H$ in which R represents a hydrocarbon group, which may have halogen or amino substituents and contains not less than six carbon atoms. Suitable acids are those which yield salts having sufficient solubility in the polymer—filler mixture to permit ready dispersion of the additive throughout the composition. Preferred acids are those in which R represents a hydrocarbon group comprising an alkyl chain having not less than six carbon atoms, more preferably having 6 to 18 carbon atoms, acid and dodecylsulphonic acid and those having a halogenated alkyl group having up to 18 carbon atoms. The most preferred acids have the formula $R'C_6H_4SO_3H$ where $R'$ represents a group R as defined above and is preferably an alkyl group having 6 to 18 carbon atoms. A preferred acid is dodecylbenzenesulphonic acid, hereinafter referred to as DBSA.

In a composition according to the invention, the additive may be incorporated into the composition in any convenient way. For example, the salt may be prepared in advance of its admixture with the polymer and filler, or it may be formed in situ by addition of the appropriate acid to a composition comprising the polymer and a compound reactive with the acid to form the salt or by addition to a composition containing the polymer and appropriate acid of a compound reactive with the acid to form the salt. The calcium salts may be prepared in advance of admixture with the composition by, for example, adding the acid to an aqueous dispersion of calcium carbonate filler. One convenient way of providing filler containing the additive is to treat a batch of filler, for example of calcium or magnesium carbonate, with a proportion of the selected sulphonic acid sufficient to provide for example not less than 0.5 part by weight of the additive per 100 parts by weight of the filler. The treated batch or a portion thereof may be mixed with the desired proportion of polymer to provide a composition according to the invention.

A composition according to the invention may comprise a large proportion of the additive if desired, but in most cases we prefer to employ less than about 10, preferably less than about 5 parts by weight of the additive per 100 parts of the filler having a particle size of greater than 0.05 microns in order to achieve satisfactory beneficial properties. Certain properties of some compositions may be adversely affected if larger proportions of the additive are present whereas a lowering of the modulus of the cured composition requires use of not less than 0.5 part, by weight per 100 parts by weight filler. We prefer to prepare the additive by treating a finely divided solid (e.g. the filler) metal oxide, hydroxide, carbonate, bicarbonate or a mixture thereof with the sulphonic acid, preferably in presence of the polymer, in proportions of 100 moles of the metal compound to 0.5 to 5.0 moles of the sulphonic acid.

Compositions according to the invention demonstrate a lower modulus of the cured composition and a substantially improved ease of mixing of the compositions during the manufacture thereof and prior to curing as compared with similar compositions which do not include the additive. The additive salts thus find use in the more highly filled single part and multiple part compositions which are intended to provide low modulus products, or which are prepared by mixing in the absence of solvent and which, when so mixed in the absence of the additive become stiff and difficult to manage.

Polysiloxanes suitable for use in compositions according to the invention include the polysiloxanes used for one and two part room temperature vulcanising silicone elastomers which may be employed, for example as protective coatings, encapsulants or sealants, as well as the polysiloxanes employed in compositions which cure at higher temperatures to provide elastomeric products. The compositions may be used to provide foamed or non-foamed, rigid or elastomeric products.

Preferred polysiloxanes for use in a composition according to the invention are polydiorganosiloxanes having silicon-bonded hydroxyl groups and derivatives thereof and alkenylpolysiloxanes used in room temperature vulcanising silicone elastomers. The polysiloxanes may be linear or branched and may have a functionality of two or more. $\alpha, \omega$ dihydroxypolysiloxanes are most preferred and these may be represented by the general formula $HO(R''_2SiO)_xH$ wherein each $R''$ represents for example, a saturated or unsaturated, substituted or unsubstituted hydrocarbon group for example an alkyl group having up to twelve carbon atoms (e.g. methyl, ethyl, propyl, vinyl or allyl) or an aromatic group (e.g. phenyl) and x is an integer which may be such that the polymer has the consistency of a fluid or a gum. These are well known materials and may be made by procedures well known in the art. Usually they are made by the addition of diorganodichlorosilanes to a water/solvent mixture to yield a mixture of low molecular weight hydroxy end-blocked oligomers and cyclic siloxanes in solvent. The mixture may be purified to separate low molecular weight linear $\alpha, \omega$ dihydroxypolydiorganosiloxane oligomers from cyclic polysiloxanes. Linear $\alpha, \omega$ dihydroxy polydiorganosiloxane polymers of desired molecular weight may be manufactured from the low molecular weight linear $\alpha, \omega$ dihydroxy polydiorganosiloxane oligomers (produced as aforesaid or by a process involving ring opening of the cyclic materials referred to) by way of condensation and equilibration in presence of catalyst. The catalyst used for manufacture by way of bulk polymerisation is generally a basic catalyst which can be removed from the reaction mixture. One may also prepare a hydroxypolysiloxane by chain extension of an $\alpha, \omega$ dihydroxy polydiorganosiloxane at room temperature in a short time to a higher viscosity fluid or a gum by agitation in an open or closed mixing chamber for example a static mixer, planetary mixer or twin screw extruder in presence of an acid, for example dodecylbenzene sulphonic acid as condensation catalyst and water in controlled proportions. Thus, one may produce polymers having a value of x such that the polymers have a viscosity in the range 30 mm$^2$/s to 2,000,000 mm$^2$/s. In preferred materials at least 85% and preferably all of the $R''$ groups are methyl. These polymers may be used as such or converted into a form in which they may be used to provide one or two package curable compositions. Thus one may formulate compositions using polysiloxanes having silicon-bonded hydroxyl or alkoxy groups and curatives having silicon-bonded reactive groups to form a polysiloxane corresponding to mixture and/ or a reaction product of the polydiorganosiloxane having silicon-bonded hydroxyl or alkoxy groups with a compound containing silicon-bonded groups which are reactive with or become reactive with (e.g. under influence of atmospheric moisture) the silicon-bonded hydroxyl or alkoxy groups.

Suitable curatives which may be used, for example, include the known moisture vapour activated crosslinkers, i.e. those which employ acetoxy, alkoxy, alkoxyalkoxy, amino, aminoxy, amido, acetamido or oxime substituted silanes (as exemplified by methyltriacetoxy silane, methyltrimethoxy silane, methyltris cyclohexylamino)silane, methyltrihexanoxy silane and methyltris(methylethylketoxime) silane together with appropriate catalysts as required e.g. tin salts, and titanium compounds. Suitable tin salts include tin salts of carboxylic acids and particularly the stannous salts of the more commonly available carboxylic acids. Examples of suitable materials are dibutyl tin dilaurate, stannous acetate, stannous napthenate, stannous benzoate, stannous sebacate, stannous succinate and stannous octoate. Suitable titanium compounds include certain alkyl titanates and alkyl titanium esters for example tetraisobutyl titanate and tetraisopropyl titanate.

Suitable alkenylpolysiloxanes include polymers having units according to the general formula $R''_m(Q)SiO_{(3-m)/2}$ in which each Q represents an alkenyl group, for example a $-CH=CH_2$ or a $-CH_2-CH=CH_2$ group, which is linked to the silicon atom by way of a carbon or oxygen atom, each $R''$ is as defined above and is preferably a methyl group and m is 1 or 2. These polysiloxanes also comprise units $R''_nSiO_{(4-n)/2}$ in which $R''$ is as referred to above and n is 0, 1, 2, or 3. These materials are preferably liquids and are chosen so that their functionality is appropriate in relation to the degree of chain extension and crosslinking required during curing of the composition. Preferred alkenylpolysiloxanes include those in which the alkenyl groups provide less than about 5% of the total silicon-bonded organic groups of the polymer. The alkenyl groups may be attached to terminal silicon atoms of the polysiloxane chain or to silicon atoms along the chain or both. Suitable alkenyl polysiloxanes include dimethylvinyl endblocked siloxanes and phenylmethylvinyl end-blocked polydimethylsiloxanes. The alkenyl polysiloxanes may be cured for example with polysiloxanes having alkylhydrogensiloxane units in presence of a hydrosilylation catalyst. Suitable polysiloxanes having alkylhydrogensiloxane units include polymers having units of the general formula $R''_pHSiO_{(3-p)/2}$ in which each $R''$ is as aforesaid, and p is 1 or 2. The alkylhydrogen polysiloxanes may also comprise units $R''_nSiO_{(4-n)/2}$. Preferably terminal groups of the alkylhydrogen polysiloxane have the formula $R''_3SiO_{\frac{1}{2}}$ where each $R''$ represents a methyl group. Suitable alkylhydrogen polysiloxanes include those comprising MeHSiO units with or without the presence of $Me_2SiO$ units and having viscosities of the order of from about 10 to about 100 $mm^2/s$.

Suitable catalysts for the hydrosilylation reaction include the platinum catalysts which may take any of the known forms, ranging from platinum as deposited on carriers such as silica gel or powdered charcoal, to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on colour of the mixture. Platinum complexes may also be used e.g. those prepared from chloroplatinic acid hexahydrate and divinyl tetramethyldisiloxane.

One may also include in a composition according to the invention the usual optional additives, for example, colorants, antioxidants, liquid extenders, for example polydimethylsiloxane fluids and adhesion promoters.

A composition according to the invention may be prepared by mixing the ingredients together in any desired order. For example, the preferred one part, moisture curable sealants may be made by adding a metal carbonate as filler to a polydiorganosiloxane having silicon-bonded hydroxyl groups and a viscosity of about 1,000 to 100,000 $mm^2/s$, adding the sulphonic acid in appropriate amount to form the desired proportion of the additive in situ and then adding the catalyst and cross linking agent. The additive may be added in the form of the prepared salt to the mixture of polymer and filler. If this route is chosen, it is preferred to add the salt as a paste or dispersion in water and to remove the water e.g. by vacuum distillation. It is also possible to add metal compound e.g. calcium carbonate to polymer containing the acid in order to form the additive in situ. It is necessary to remove excess water from the mixture before the cross linking agent is added. Colorants and minor additives may be added to the mixture at any desired stage, and this is preferably done as near the end of the mixing procedure as possible.

In order that the invention may become more clear, follows a description of example compositions provided by the invention and illustrative thereof. In the examples, all parts are expressed by weight unless otherwise specified.

EXAMPLE A

Three portions of a composition for use as Part (A) of a two part room temperature curing sealant formulation were prepared by mixing materials in the following proportions. 52 parts of a mixture of linear $\alpha,\omega$ dihydroxypolydimethylsiloxanes having a number average molecular weight of about 40,000 and minor amounts of cyclic polydimethylsiloxanes, 46 parts of 2.5% stearate coated calcium carbonate having an average particle size of 0.07 to 0.08 microns and 2 parts of a low molecular weight $\alpha,\omega$ dihydroxypolydimethylsiloxane were mixed in a planetary mixer. A first of the portions (a) was used as such. To the second and third portions (b) and (c) were also added 1.25 and 2.5 parts respectively of DBSA. The portions were mixed for 20 minutes in a planetary mixer. It was found that the portions (b) and (c) required less energy to produce a homogenous mixture than portion (a), the energy required for portion (c) being less than that for portion (b).

Example compositions 1, 2 and 3 were prepared by mixing with 100 parts of portions (a), (b), and (c) respectively 10 parts of a Part (B) containing 26 parts n-propylorthosilicate, 13 parts $\gamma$-aminopropyltriethoxysilane, 0.5 parts dibutyl tin dilaurate and 60.5 parts low molecular weight trimethyl siloxy end blocked polydimethylsiloxane fluid (hereinafter referred to as pdms fluid).

The Example compositions were cast to form 2 mm thick sheets and allowed to cure at 25° C. in a relative humidity of 50% for 14 days. Samples cut from the sheets were used to determine the hardness (H) in Shore A, the tensile strength (TS) in MPa, elongation at break (EB) as a percentage of initial length of the sample and modulus at 100% extension (M) in MPa of the cured compositions. The results are recorded in Table 1.

TABLE 1

| Example | H | TS | EB | M |
|---|---|---|---|---|
| Composition 1 | 34 | 1.97 | 188 | 0.99 |
| Composition 2 | 32 | 1.82 | 355 | 0.79 |
| Composition 3 | 22 | 1.04 | 477 | 0.41 |

From these results it can be seen that use of increased amounts of DBSA led to reduced hardness, reduced tensile strength, increased elongation at break and reduced modulus, thus indicating a satisfactory basis for a low modulus sealant.

EXAMPLE B

A one part room temperature curing sealant formulation was prepared by mixing materials in the following proportions. 39 parts of linear $\alpha, \omega$ dihydroxypolydimethylsiloxane having a viscosity of about 50,000 $mm^2/s$, 11 parts pdms fluid and 50 parts 2.5% stearate coated calcium carbonate having an average particle size of 0.07 microns were mixed in a planetary mixer. Example composition 4 was made by adding to 94 parts of this formulation 6 parts of a curative blend comprising 4.6 parts methyl tris(methylethylketoxime) silane, 1.2 parts γ-aminopropyltriethoxysilane and 0.2 parts dibutyl tin dilaurate. Example composition 5 was prepared from the same formulation as Example composition 4 with further addition of 1 part DBSA to the mixture prior to the addition of the curative blend. It was found that the energy required to stir the mixture, after inclusion of DBSA and before addition of the curative blend during preparation of Example composition 5 was less than that required for Example composition 4.

The example compositions were cast to form 2 mm thick sheets and allowed to cure at 25° C. in a relative humidity of 50% for 7 days. Samples cut from the sheets were tested as described in Example A. Results are recorded in Table 2.

TABLE 2

| Example | H | TS | EB | M |
|---|---|---|---|---|
| Composition 4 | 47 | 2.21 | 365 | 1.05 |
| Composition 5 | 40 | 1.93 | 570 | 0.76 |

From these results it can be seen that Example composition 5 showed reduced hardness, reduced tensile strength, increased elongation at break and reduced modulus, as compared with Example composition 4, thus indicating a satisfactory basis for a low modulus sealant.

EXAMPLE C

A one part room temperature curing sealant formulation was prepared by mixing 100 parts of linear α,ω dihydroxypolydimethylsiloxane having a viscosity of about 50,000 mm²/s, 30 parts pdms fluid and 130 parts 2.5% stearate coated calcium carbonate having an average particle size of 0.07 micron. Example compositions 6 to 11 were prepared from portions of this mixture by addition of 2.5 parts per 100 parts of the hydroxy polysiloxane of acids and salts as listed in Table 3, followed by addition to each of the portions of 10 parts per 100 parts of the hydroxy polysiloxane of a curative blend comprising 7 parts methyl trimethoxysilane, 2.5 parts titanium diisopropoxy di ethylacetoacetate and 0.2 parts N-β- aminoethyl-γ-aminopropyltrimethoxysilane. The compositions were mixed in a planetary mixer. It was found that the effectiveness of the additives provided by, or formed from, the added acids or salts in reducing the energy required to stir the mixtures, after inclusion of the acid or salt and before addition of the curative blend was, in order of increasing effectiveness, ESA, NaDBS, EBSA, IDS, DBSA.

The example compositions were cast to form 2 mm thick sheets and allowed to cure at 23° C. in a relative humidity of 50% for 7 days. Samples cut from the sheets were tested as described in Example A.

TABLE 3

| Example | Additive | H | TS | EB | M |
|---|---|---|---|---|---|
| Composition 6 | nil | 32 | 2.59 | 385 | 0.82 |
| Composition 7 | IDS | 20 | 2.26 | 800 | 0.33 |
| Composition 8 | DBSA | 24 | 1.93 | 730 | 0.42 |
| Composition 9 | NaDBSA | 27 | 1.99 | 650 | 0.50 |
| Composition 10 | EBSA | 36 | 2.11 | 415 | 0.85 |
| Composition 11 | ESA | 33 | 2.31 | 340 | 0.92 |

In the Table, IDS means isopropylamino dodecylbenzene sulphonate, DBSA means dodecylbenzene sulphonic acid, NaDBS means sodium dodecylbenzene sulphonate (added as a paste with water which was subsequently removed), EBSA means 4-ethylbenzene sulphonic acid and ESA means ethane sulphonic acid.

From these results it can be shown that Example compositons 7, 8 and 9 had EB values in excess of 600% and M values of less than 0.55 whereas composition 6 had an EB value of 385% and an M value of 0.82. It is noted that Example composition 10 had elongation and modulus values rather similar to those of the comparative Example composition 6 and that Example composition 11 had higher modulus and lower elongation values than composition 6.

EXAMPLE D

A one part room temperature curing sealant formulation was prepared by mixing 90 parts of linear α,ω dihydroxy polydimethylsiloxane having a viscosity of about 50,000 mm²/s, 50 parts pdms fluid and 150 parts untreated precipitated calcium carbonate having an average particle size of 0.07 micron. The mixture became very stiff and difficult to mix and it was impossible to achieve a homogenous blend by use of a conventional mixer. Example compositions 12 and 13 were prepared from portions of this mixture by addition of 2.5 and 5.0 parts of DBSA respectively, per 100 parts of the hydroxy polysiloxane followed by addition to each of the portions of 10 parts per 100 parts of the hydroxy polysiloxane of a curative blend comprising 9.5 parts methyl trimethoxysilane, 2.5 parts titanium diisopropoxy di ethylacetoacetate and 0.2 part N-β-aminoethyl-ε-aminopropyltrimethoxysilane. The compositions were mixed in a planetary mixer. It was found that the additives provided by the addition of DBSA enabled stirring of the mixtures to form a homogenous blend in a conventional mixer.

The example compositions were cast and cut to form samples as described in Example C which were tested as described in Example A. Results are recorded in Table 4.

TABLE 4

| Example Composition | H | TS | EB | M |
|---|---|---|---|---|
| 12 | 27 | 1.07 | 540 | 0.45 |
| 13 | 24 | 0.92 | 630 | 0.33 |

From these results it can be shown that use of an additive formed by reaction of calcium carbonate and DBSA in increased amount leads to cured products giving increased elongation at break and lower modulus in compositions using untreated calcium carbonate.

EXAMPLE E

A one-part room temperature curing sealant formulation was prepared by mixing 100 parts of linear α,ω dihydroxypolydimethylsiloxane having a viscosity of about 50,000 mm²/s, 30 parts pdms fluid, 180 parts ground, 0.4% stearate coated calcium carbonate having an average particle size of 2 micron and 12 parts fumed silica having an average particle size of 0.001 micron. The mixture was divided into two portions. A first of the portions (A) was used as such. The second portion (B) also included 2.7 parts of DBSA per 100 parts of the hydroxy polysiloxane. The portions were mixed in a planetary mixer. Example compositions 14 and 15 were obtained from portions (A) and (B) respectively by addition of a mixture of 7 parts methyl trimethoxysilane, 2 parts titanium diisopropoxydiethylacetoacetate and 0.2 parts N-β-aminoethyl-γ-amino-propyltrimethoxysilane per 100 parts of the hydroxy polysiloxane.

The example compositions were cast and cut to form samples as described in Example C which were tested as described in Example A. Results are recorded in Table 5.

TABLE 5

| Example Composition | H | TS | EB | M |
|---|---|---|---|---|
| 14 | 25 | 0.64 | 525 | 0.37 |
| 15 | 12.5 | 0.63 | 620 | 0.19 |

From these results it can be shown that the increased elongation and reduced modulus properties are exhibited by compositions made using DBSA and treated calcium carbonate in presence of a minor amount of fumed silica.

EXAMPLE F 100 parts of hydroxyl end-blocked polydimethylsiloxanes containing less than 5% $(Me_2SiO)_y$ cyclics, having a viscosity at 25° C. of 100 mm²/s and having a total hydroxyl content of less than 1%, and about 600 parts per million of water were placed in a planetary mixer. 2.5 parts of DBSA were added. The mixture reacted rapidly at room temperature producing a polymer comprising an α,ω dihydroxy polydimethylsiloxane having a viscosity of 50,000 mm²/s within 30 minutes. When the polymer had a viscosity of 50,000 mm²/s, 10 parts of 2.5% stearate coated calcium carbonate having an average particle size of about 0.075 micron was added and mixing continued. Increases in viscosity ceased. 120 parts of the stearate coated calcium carbonate and 30 parts of pdms fluid were added. A mixture of 7 parts of methyl trimethoxy silane, 2.5 parts titanium diisopropyl di-ethylacetoacetate and 0.2 part N-β-aminoethyl-γ-aminopropyltrimethoxysilane was added. The mixture thus prepared provided a one-part sealant composition curable in the atmosphere at room temperature to a tack free condition in 30 minutes. Samples of the cured sealant composition had TS, M and EB values (measured as in Example A) of 1.9 MPa, 0.36 MPa and 780%. Note that composition 6, a similar formulation using no additive formed from a sulphonic acid showed a higher TS (2.59), a higher modulus (0.82) and a lower elongation at break (385).

EXAMPLE G

Room temperature curable compositions were prepared from a Part A and a Part A' respectively. The part A comprised 100 parts of a dimethyl vinyl end-blocked polydimethylsiloxane having a viscosity of about $4.5 \times 10^{-4}$ mm²/s and 125 parts of precipitated stearate coated calcium carbonate (particle size 0.08 micron). a second composition was prepared using a Part A' of the same formulation as the Part A together with an additional 0.7 parts DBSA. 100 parts of Part A and 100 parts of Part A' were each thoroughly mixed with 0.6 part methyl vinyl cyclic polysiloxane, 1.5 parts of a trimethylsiloxy end blocked polydimethyl polymethylhydrogen siloxane having a viscosity of about $5 \times 10^{-6}$ mm²/s and about 7.5% by weight silicon-bonded hydrogen atoms, and 0.12 part of a platinum catalyst to provide compositions 17 and 18 respectively. The compositions were mixed and cast into 2 mm thick sheets which were kept for 24 hours to cure. Physical properties of the cured sheets were measured as described in Example A. The results are recorded in Table 6.

TABLE 6

| Example composition | H | TS | EB | M |
|---|---|---|---|---|
| 17 | 50 | 1.25 | 142 | 1.13 |
| 18 (containing DBSA) | 46 | 1.12 | 129 | 1.01 |

The results show that composition 18 showed lower modulus, tensile strength and hardness as compared with composition 17.

The embodiments of the invention in which an exclusive privilege or property is claimed are as defined as follows:

1. A nonaqueous composition comprising 100 parts by weight of polysiloxane, 50 to 200 parts by weight of finely divided filler having an average particle size greater than 0.05 micron selected from the group consisting of a metal oxide, hydroxide, carbonate, or bicarbonate of calcium, magnesium, barium, or zinc, or a mixture thereof, and not less than 0.5 parts by weight per 100 parts by weight of the filler of an additive consisting of a reaction product of an organic amine, or a metal oxide, hydroxide, carbonate, or bicarbonate or a mixture thereof with a sulphonic acid of the formula $RSO_3H$ in which r represents a hydrocarbon group which may have halogen or amino substituents and which contains not less than six carbon atoms, with the proviso that if any filler having an average particle size less than 0.05 micron is present it must be less than the amount of filler present which has an average particle size greater than 0.05 micron.

2. A composition according to claim 1 consisting essentially of less than 5.0 parts by weight additive per 100 parts by weight of said filler.

3. A nonaqueous composition comprising 100 parts by weight of polysiloxane; 85 to 200 parts by weight of finely divided filler having an average particle size greater than 0.05 micron selected from the group consisting of a metal oxide, hydroxide, carbonate, and bicarbonate of calcium, magnesium, barium, and zinc, and a mixture thereof; and not less than 0.5 parts by weight per 100 parts by weight of the filler of an additive consisting of a reaction product of an organic amine, or a metal oxide, hydroxide, carbonate, or bicarbonate of sodium, magnesium, zinc, calcium, barium, aluminum, or a mixture thereof, with a sulphonic acid of the formula $RSO_3H$ in which R represents a hydrocarbon group which may have halogen or amino substituents and which contains not less than six carbon atoms, with the proviso that if any filler having an average particle size less than 0.05 micron is present it must be less than the amount of filler present which has an average particle size greater than 0.05 micron.

4. A composition according to claim 1 wherein the group R of the sulphonic acid is a group $R'C_6H_4$ where R' represents an alkyl group having 6 to 18 carbon atoms.

5. A composition according to claim 4 wherein the sulphonic acid is dodecylbenzenesulphonic acid.

6. A composition according to claim 1 wherein the filler has an average particle size in the range 0.05 micron to 5 microns.

7. A composition according to claim 1 comprising less than 5.0 parts by weight additive per 100 parts by weight of said filler.

8. A composition according to claim 1 wherein the polysiloxane comprises the product obtained by mixing a polydiorganosiloxane having silicon-bonded hydroxyl or alkoxy groups with a compound containing silicon-bonded groups which are reactive with or become reactive with the silicon-bonded hydroxyl or alkoxy groups under the influence of moisture.

9. A composition according to claim 8 wherein the polydiorgano siloxane having silicon-bonded hydroxyl groups is an α, ω dihydroxypolysiloxane of the general formula $HO(R''_2SiO)_xH$ wherein each $R''$ represents a saturated or unsaturated, substituted or unsubstituted hydrocarbon group and x is an integer such that the polymer has a viscosity in the range 30 mm$^2$/s to 100,000 mm$^2$/s.

10. A composition according to claim 8 wherein the compound containing silicon-bonded groups which are reactive with or become reactive with the silicon-bonded hydroxyl or alkoxy groups comprises a silane having two or three acetoxy, alkoxy, alkoxyalkoxy, or oxime groups.

* * * * *